J. M. NOLL & F. J. MILLER.
SEPARATOR FOR FEED WATER HEATER.
APPLICATION FILED AUG. 4, 1909.
1,134,633.
Patented Apr. 6, 1915.
3 SHEETS—SHEET 1.
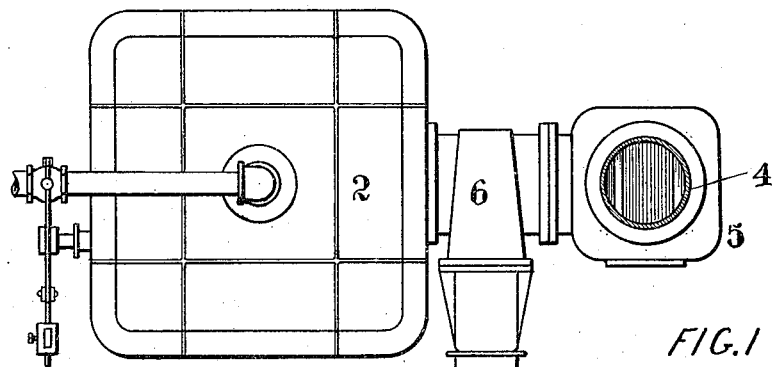
FIG. 1
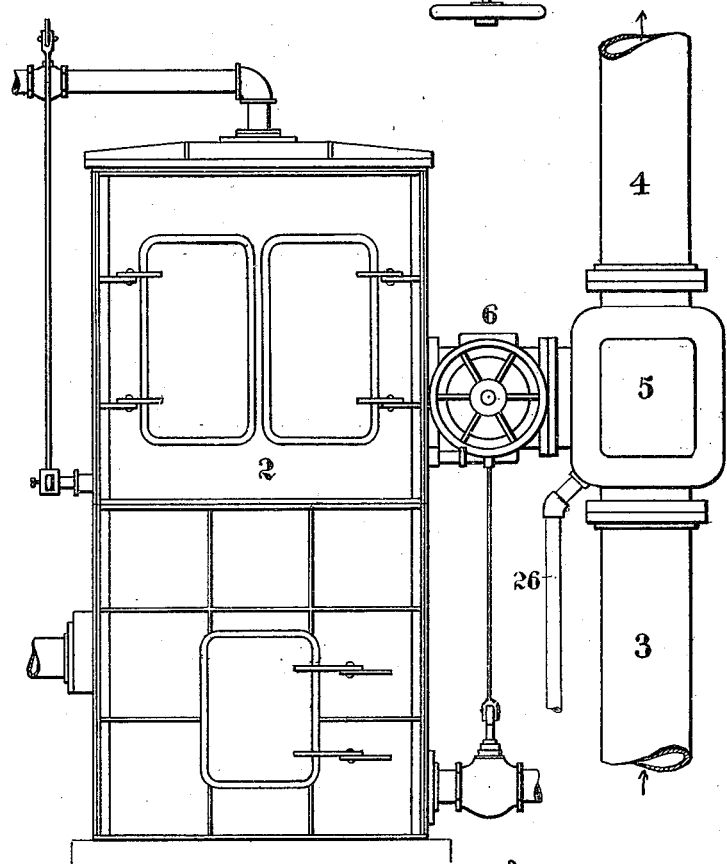
FIG. 2
WITNESSES
E. H. Barlow.
E. G. Farley.
INVENTORS
Jacob M. Noll
Frank J. Miller
BY
ATTORNEY J. M. NOLL & F. J. MILLER.
SEPARATOR FOR FEED WATER HEATER.
APPLICATION FILED AUG. 4, 1909.

1,134,633.

Patented Apr. 6, 1915.
3 SHEETS—SHEET 2.

WITNESSES
E. H. Barlow
E. G. Farley

INVENTORS
Jacob M. Noll and
Frank J. Miller
BY
ATTORNEY

J. M. NOLL & F. J. MILLER.
SEPARATOR FOR FEED WATER HEATER.
APPLICATION FILED AUG. 4, 1909.

1,134,633.

Patented Apr. 6, 1915.
3 SHEETS—SHEET 3.

WITNESSES
E. H. Barlow.
E. J. Farley.

INVENTORS
Jacob M. Noll and
Frank J. Miller
BY
ATTORNEY

UNITED STATES PATENT OFFICE.

JACOB M. NOLL, OF COLLINGSWOOD, NEW JERSEY, AND FRANK JOSEPH MILLER, OF PHILADELPHIA, PENNSYLVANIA, ASSIGNORS TO WARREN WEBSTER & COMPANY, A CORPORATION OF NEW JERSEY.

SEPARATOR FOR FEED-WATER HEATER.

1,134,633. Specification of Letters Patent. Patented Apr. 6, 1915.

Application filed August 4, 1909. Serial No. 511,178.

*To all whom it may concern:*

Be it known that we, JACOB M. NOLL, a citizen of the United States, and a resident of Collingswood, county of Camden, State of New Jersey, and FRANK JOSEPH MILLER, a citizen of the United States, and a resident of the city and county of Philadelphia, State of Pennsylvania, have invented an Improvement in Separators for Feed-Water Heater, of which the following is a specification.

Our invention has reference to separators for feed-water heater and consists of certain improvements which are fully set forth in the following specification and shown in the accompanying drawings which form a part thereof.

Our invention more particularly relates to improvements in separators used in conjunction with feed-water heaters and the object of our invention is to simplify and cheapen the construction of the separator apparatus whereby the feed-water heater apparatus, as an entirety, will be less expensive to build.

Our invention further has for its object the provision of more efficient means for separating the water and oil from the exhaust steam before passing into the feed-water heater or to the atmosphere; and also to reduce the amount of space necessary or permit special arrangement of the parts for the installation of the necessary appliances which will act as a separator to the feed-water heater.

Our invention consists of certain features of construction which are fully described hereinafter and more particularly defined in the claims.

Figure 3:
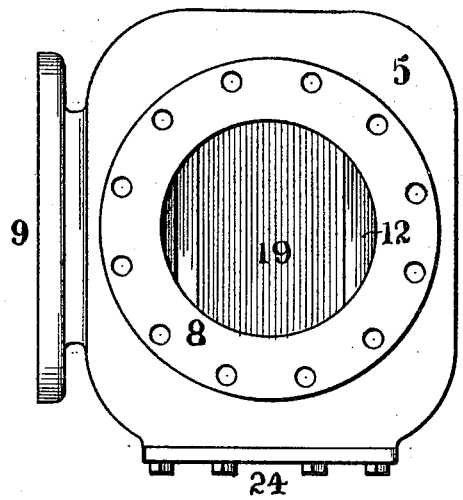
Figure 4:
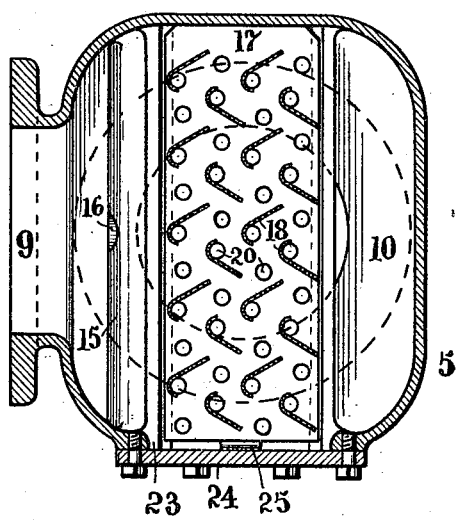
Figure 5:
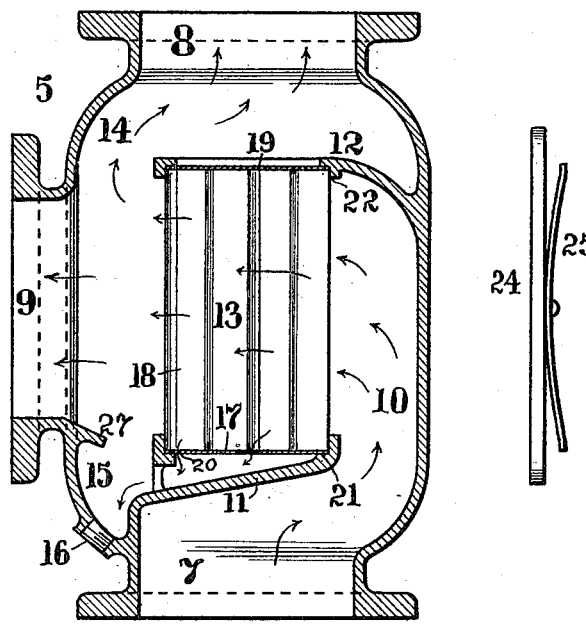
Figure 6:
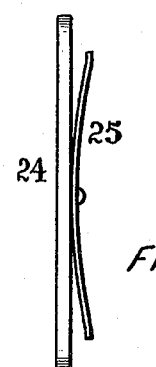

The invention will be better understood by reference to the drawings, in which:

Figure 1 is a plan view of a feed-water heater with our improved separator applied thereto; Fig. 2 is an elevation of the same; Fig. 3 is a plan view of the separator on a larger scale; Fig. 4 is a sectional plan view of the separator; Fig. 5 is a sectional elevation of the separator; Fig. 6 is an edge view of the separator cover with spring attachments; and Figs. 7 to 11 are elevations of modifications of our invention.

2 is the feed-water heater proper and may be made in any suitable manner desired.

3 is an exhaust pipe which leads from a steam engine or other source of steam waste; 4 is the exhaust pipe leading to the atmosphere or to the steam heating system as ordinarily employed but which is not shown; 5 is the separator embodying our improvements, and is located between the exhaust pipe sections 3 and 4, and 6 is the gate valve connecting the side of the separator 5 with the feed-water heater 2.

It will be observed that the separator is essentially a T shaped fitting, permitting, in the preferred form, the exhaust pipe sections 3 and 4 to be in exact alinement and allowing a connection with the feed-water heater through the shortest possible space, namely that occupied by the gate valve 6. This valve 6 may be made in any suitable manner and may correspond to valves which are now sold upon the market or may be of any special construction with a view of occupying less space.

Referring more specifically to the separator, it consists of a body part having a lower inlet 7 and an upper outlet 8 and a lateral outlet 9. Arranged within the separator and extending across the same is a steam and oil separating device 13 consisting of an upper solid plate 19, a lower perforated plate 17 having apertures 20, and intermediate vertical baffle plates 18, the planes of whose surfaces are arranged obliquely to each other and the rear edges of which are bent or curved to form vertical gutters which preferably terminate at the bottom adjacent to the apertures 20 in the lower plate. The water and oil separator device slides into guide grooves 21 and 22 within the body of the separator 5 and may be inserted or removed through an aperture in the side of the body which is normally closed by a cover plate 24. This cover plate may be provided with a flat spring 25, the free ends of which may press upon the plates 17 and 19 of the steam and oil separator device 13 to hold it in position. In this way a loose fit may be employed without liability of rattling. The inlet 7 is bounded by a wall 11 and continues as a passage 10 to the side of the separator device 13 and opposite from the outlet 9 and by which passage the steam is fed to the separator device 13 directly opposite to the outlet 9 to the feed-water heater. The space 14 between the outlet 9 and the separator device 13 extends upward and communicates with the outlet 8 which is connected with the exhaust pipe 4 to the atmosphere or to the pipe leading to the steam heating system in the usual way. A transverse partition or diaphragm 12 separates the passage 10 from the outlet 8 so that the steam is required to pass between the baffle plates 18 in its passage either to the feed-water heater 2 or to the pipe 4, or to both. The body of the separator 5 is also provided with a drainage chamber 15 below the space between the outlet 9 and the separator device 13 and communicates with the under parts of the perforated plates 17 so that the water and oil separated by the baffle plates 18 run downward through the perforations 20 in the plate 17 and on the incline partition 11 from which it runs down into the said receiver or chamber 15 and from which it may be drawn through an outlet 16 with which a suitable drainage pipe 26 communicates.

It will be understood from the construction employed, that the water of condensation which may run into the separator body from the pipe 4 or which may be separated by the baffle plates within the separator body will find its way in the chamber or receiver 15 from which it may be drawn off or allowed to escape, while preventing the escape of steam. The outlet 9 adjacent to its lower part and within the body is provided with a downwardly extending oblique flange 27 which guides the steam toward the outlet and away from the chamber 15 and the water therein; and said flange may also direct any water running downward within the body and adjacent to the outlet into the chamber or receiver.

By the employment of a separator of the character described the water and oil are removed from the steam so that nothing but clean steam is delivered to the exhaust pipe or heater, and hence the use of an exhaust head on the top of the exhaust pipe is not necessary. This is also important when the exhaust steam is used for heating purposes by employment of radiators or coils. The arrangement of the apparatus is such that when the gate valve 6 is opened, the direction of the flow of steam through the baffle tends to cause the steam to flow directly into the heater 2, the excess finding its way to the heating system or atmosphere by the outlet 8 and the pipe 4.

By providing the separator device within the body 5 in alinement with the exhaust pipes 3 and 4, there will be no loss of space required by elbow and multiplicity of connection which have heretofore been generally employed in making connection between the feed-water heater and the exhaust pipe; and moreover, the construction is exceedingly simple, easily assembled and dismantled and quickly and easily cleaned, when necessary. Furthermore, the construction is one in which the cost is reduced to a minimum considering the results to be obtained and the machine work upon the appliance is small in amount because it is of a character which can be performed at the lowest cost. The amount of metal required in the construction of the separator is also less than that which is usually employed in elbow and fittings in addition to the separator mechanism itself.

Figure 7:
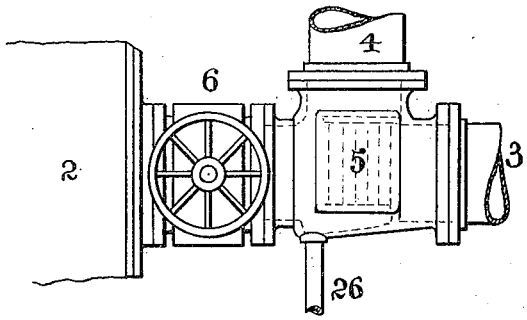
Figure 8:
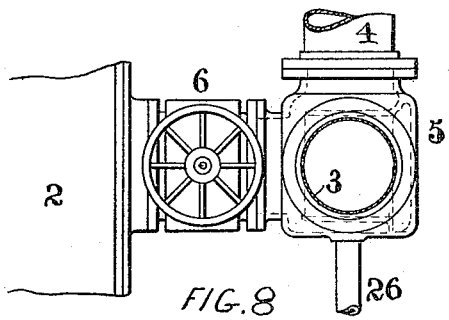
Figure 9:
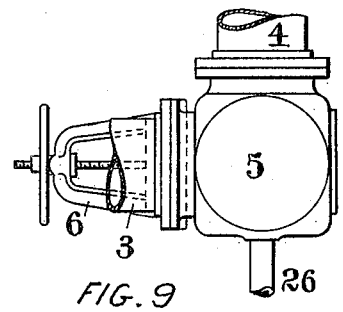
Figure 10:
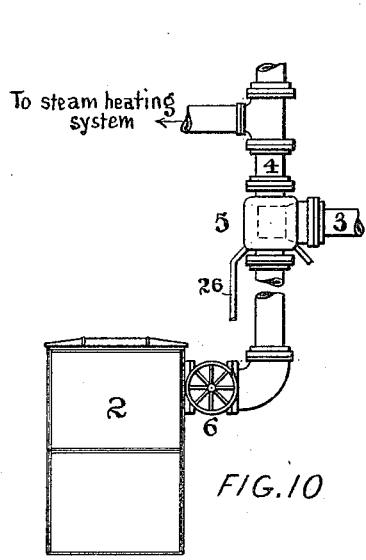
Figure 11:
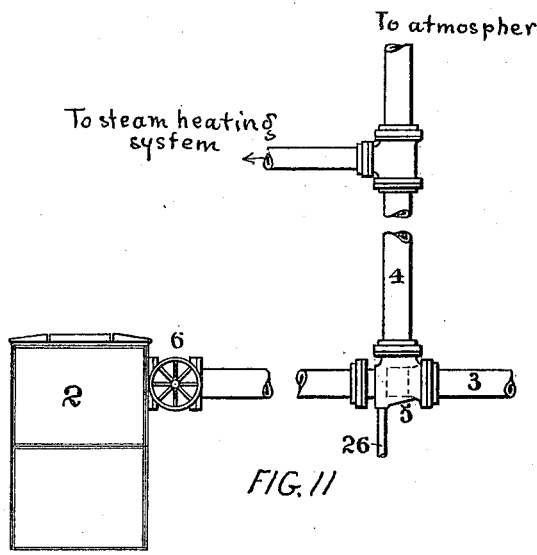

While we have shown in Figs. 1 to 5, the preferred arrangement of inlets and outlets for our improved separator, and which would be employed where the space for the connection will permit, nevertheless, in some cases the pipe connections are such that the inlets and outlets must be varied, and as examples of these, we have shown Figs. 7 to 11, inclusive. In Fig. 7 the exhaust pipe 3 communicates with the body directly opposite the separator device 13, as if it entered the passage 10 in Fig. 5. In Figs. 8 and 9 the construction is the same except that the exhaust pipe enters from the side most distant from the cover plate 25. In Fig. 10 the exhaust pipe 3 enters on the side, and the outlet ports are arranged above and below. In Fig. 11 the separator is shown similarly arranged as in Fig. 7, except that there is a section of pipe between the gate valve and the side outlet of the separator. The general construction, however, of the separator in all of these modifications is the same as that shown in the preferred form, namely, in which there is one inlet and two outlets, said inlet and outlets separated by a baffle device, and a diaphragm chamber opening from below the baffles.

We have shown a desired form of baffle plates but it is evident that the baffle structure may be made in any suitable manner other than that shown; and in general, while we prefer the construction shown, the details may be modified without departing from the spirit of the invention.

Having now described our invention what we claim as new and desire to secure by Letters Patent, is:

1. In an apparatus of the character stated, the combination of a body having an inlet for steam at the bottom and outlets for steam at the top and at one side and said outlets being formed of similar construction, baffle devices arranged within the body and opening at one side in communication with the inlet and at the other side in communication with the two outlets, and a valve shaped for interchangeable connection with the two outlets whereby it may be connected with either outlet for the purpose of regulating or controlling the flow therethrough.

2. In an apparatus of the character stated, the combination of a separator body having one inlet and two outlet apertures through its walls said outlet apertures being of substantially the same areas and of similar flanged construction as to their bounding walls at the outside, baffle devices within the body having one side in communication with the inlet aperture and the other side in communication with the two outlet apertures, a valve having a flanged inlet part adapted for connection to either of the flanged outlets so as to be interchangeable whereby the steam from one of said outlets may be controlled as predetermined.

3. In an apparatus of the character stated, a separator body having an inlet at the bottom and a vertical passage within the body in communication with the said inlet, outlets at the top and side of the body in communication with each other within a chamber in the body, and a receiving chamber for water and oil at a lower level than the side outlet, combined with an oil and water separating device comprising top and bottom plates, and baffle plates extending between the top and bottom plates and providing transverse passages, said baffle device arranged in the body between the vertical passage and the chamber in communication with the side and top outlets, whereby the general direction of the steam in passing through the separator is changed from a vertical to a substantially horizontal direction at the time of passing through the oil and water separating device and before escaping to the outlet.

4. In an apparatus of the character stated, a separator body having an inlet at the bottom and a vertical passage within the body in communication with said inlet, outlets at the top and side in communication within the body and in which the top outlet and bottom inlet are arranged in vertical alinement, and a receiving chamber for water and oil at a lower level than the side outlet, combined with an oil and water separating device comprising horizontal top and bottom plates and intermediate baffle plates providing transverse passages opening at one side into the vertical passage of the body leading from the inlet and at the other side communicating with the outlets at the side and top, whereby the general direction of the steam in passing through the separator is changed from a vertical to a substantially horizontal direction in passing from the inlet to the outlet.

5. In an apparatus of the character stated, a separator body having an inlet at the bottom, a vertical passage within the body and in communication with the inlet, outlets at the top and side communicating within the body, and a receiving chamber for water and oil at a lower level than the side outlet and between said side outlet and the inlet and vertical passage, combined with an oil and water separating device arranged within the body and providing substantially horizontal passages for steam, said device interposed between the inlet and outlets and consisting of a solid top plate, a perforated bottom plate, and interposed vertical baffles extending between the plates said oil and water separating device in communication on one side with the vertical inlet passage and on the other side with the outlets, whereby the steam in passing through the separator is first caused to pass in a vertical and then in a horizontal direction before reaching the outlets.

6. In an apparatus of the character stated, a body provided with an inlet at the bottom and a vertical passage in communication with said inlet and also provided with outlets at the top and side of the body, combined with oil and steam separating devices arranged within the body and forming therewith substantially horizontal passages between the vertical inlet passage and the outlets, whereby the steam is caused to pass first in a vertical and afterward in a horizontal direction, the said body being further provided with an oil and water drainage chamber arranged at a lower level than the oil and steam separating devices and the outlets and communicating with the inlet only through the oil and steam separating devices.

7. In a device of the character stated, a body having a vertical passage at one side terminating in an inlet at the bottom, and also provided with two outlets one at the side and one at the top, and inwardly projecting walls to provide a transverse passage between the vertical passage from the inlet in communication with the outlets and in alinement with the side outlet, in combination with a baffle device for separating the steam and oil arranged in the transverse passage said baffle device communicating on one side with the vertical passage leading from the inlet and on the other side with the two outlets, whereby the steam is caused to pass first in a vertical and afterward in a horizontal direction when passing through the baffle device and leaves the baffle device in direct alinement with the side outlet of the body said body also provided with a receiving chamber at its lower part and only in communication with the outlets thereof and the outlet passage of the baffle device for receiving the water and oil separated from the steam.

8. A steam separator apparatus, comprising a body having a transverse baffle device for separating the steam and oil through which the steam passes in a horizontal direction, said body having a receiving chamber at a lower level than the baffle device for receiving the water and oil, and also having a steam inlet in communication with the side of the baffle device most distant from the receiving chamber, and two outlets opening from the body at different angles and communicating in a common passage opening into the other side of the baffle device, and said baffle device discharging the separated oil and water at its outlet side directly into the receiving chamber.

9. A steam separator apparatus, comprising a body having a transverse baffle device for separating the steam and oil through which the steam passes in a horizontal direction, said body having a receiving chamber at a lower level than the baffle device for receiving the water and oil, and also having a steam inlet in communication with the side of the baffle device most distant from the receiving chamber, and two outlets opening from the body at different angles and communicating in a common passage opening into the other side of the baffle device, and said baffle device discharging the separated oil and water at its outlet side directly into the receiving chamber, said baffle device consisting of horizontal top and bottom plates and vertical plates in staggered relation to form more or less obstructed horizontal passages and the vertical plates acting as guides for the oil and water to the receiving chamber.

10. In an apparatus of the character stated, a body having an inlet extended inwardly in a horizontally directed opening, an outlet opening from the body and in alinement with the inlet opening, and also a second outlet at an angle to the first mentioned outlet and in communication therewith through the body, the outlets being of the same external shape for interchange connection in use and in which the inlet and one of the outlets are in direct alinement on the opposite outer sides of the body, combined with a transversely arranged baffle device for separating the oil and water from the steam arranged in the body and communicating at one side with the horizontally arranged inlet opening and at the other side in communication with the outlets but in direct alinement with the side outlet and forming a horizontal passage for the steam between the inlet and outlet sides of the body, whereby the steam is directed from the inlet horizontally through the baffle device.

11. In a device of the character stated, a casing having an inlet at the bottom and outlets at the top and one side, a wall projecting upward from one side of the inlet and toward that side of the casing which is opposite to the side having the outlet, a diaphragm extending inwardly approximately horizontal from the second-named side of the casing to a position in vertical alinement with said wall, whereby steam is caused to pass first in a vertical and then in a horizontal direction through the apparatus in its passage from the inlet to the outlets, baffle devices mounted between the wall and the diaphragm, and a receiver below the level of the side outlet for collecting the separated oil and water.

In testimony of which invention, we hereunto set our hands.

JACOB M. NOLL.
FRANK JOSEPH MILLER.

Witnesses:
J. LOGAN FITTS,
CLARENCE B. ALLEN.

Copies of this patent may be obtained for five cents each, by addressing the "Commissioner of Patents, Washington, D. C."